United States Patent [19]

Miyamoto et al.

[11] Patent Number: 4,460,637

[45] Date of Patent: Jul. 17, 1984

[54] INK JET RECORDING SHEET

[75] Inventors: Shigehiko Miyamoto, Kamagaya; Yoshinobu Watanabe, Matsudo, both of Japan

[73] Assignee: Mitsubishi Paper Mills, Ltd., Tokyo, Japan

[21] Appl. No.: 430,385

[22] Filed: Sep. 30, 1982

[30] Foreign Application Priority Data

Dec. 24, 1981 [JP] Japan ................................ 56-271793

[51] Int. Cl.[3] .......................... B32B 3/26; B32B 7/02; B41M 5/00

[52] U.S. Cl. ................................ 428/212; 346/135.1; 428/207; 428/211; 428/215; 428/216; 428/304.4; 428/316.6; 428/317.9; 428/323; 428/327; 428/328; 428/329; 428/330; 428/331; 428/334; 428/335; 428/336; 428/409

[58] Field of Search ..................... 346/135.1; 428/207, 428/211, 328, 330, 331, 335, 336, 337, 409, 452, 454, 212, 213, 215, 216, 304.4, 316.6, 317.1, 317.9, 323, 325, 327, 329, 334, 537

[56] References Cited

U.S. PATENT DOCUMENTS 4,269,891 5/1981 Minagawa ........................... 428/335

*Primary Examiner*—Bruce H. Hess

*Attorney, Agent, or Firm*—Cushman, Darby & Cushman

[57] ABSTRACT

An ink jet recording sheet comprising a support and one or more ink receptive layers disposed thereon, which is characterized by being such that the pore radius distribution curve of the uppermost layer shows at least one peak at 0.2 to 10 μm and that of ink receptive layers as a whole shows at least two peaks, one at 0.2 to 10 mμ and the other at 0.05 mμ or below. Such a sheet brings about many advantages such as a high density and a bright color of the recorded image or letters, a high rate of ink absorption with a minimum of fethering, and the like.

35 Claims, 7 Drawing Figures

INK JET RECORDING SHEET

BACKGROUND OF THE INVENTION

This invention relates to an ink jet recording sheet. More particularly, it relates to an ink jet recording sheet which is characterized by a high density and bright color (sharp tone) of the recorded image or letters, a high rate of ink absorption with a minimum of ink feathering, and which is suitable for the multicolor recording.

The ink jet recording system has recently been rapidly popularized in various use fields including hardcopy equipments for various image patterns including "Kanji" (Chinese characters) and for color images, owing to its advantages such that (1) it operates at a high speed with a minimum of noise and is easily adaptable to multicolor recording, (2) it is adaptable to a wide variety of patterns to be recorded, and (3) neither development nor fixing is needed. Further, the quality of the recorded image by the multicolor ink jet process is comparable to that of the image produced by the conventional multicolor printing process and the printing cost is lower than that needed in the conventional printing plate process when the number of copies is not large. For these reasons, attempts are being made to apply the ink jet recording technique even to the field of multicolor printing or of the printing of color photograph.

In the ink jet recording, the surface type of a recording sheet is one of the major factors affecting the image quality. If used in the ink jet recording, those plain paper and coated paper used in general printing and baryta paper used as a base for photographic paper which have poor ink absorptivity present practically important problems arising from the ink remaining unabsorbed for a certain period of time. One problem is smudging of the recording surface caused by the unabsorbed ink, which will take place when the recorded surface touches some part of the recording equipment or an operator of the equipment or when the successively delivered recorded sheets come into brushing contact with each other. Another problem arises in the case of recording densely arranged images or of multicolor recording, where the crowded ink droplets remain unabsorbed and form larger droplets of mixed color which tend to spread out. In short, the requirements for the ink jet recording sheet include formation of an image of high density and bright color (sharp tone); rapid absorption of the ink to prevent the ink droplet from spreading out and from smudging upon contact with some object immediately after recording; and prevention of the ink dot from lateral or horizontal diffusion in the surface layer of the sheet to obtain an image of desirable resolution without feathering.

In order to solve the above problems, several proposals have heretofore been made. Examples of such proposals include an ink jet recording paper obtained from low-size stock without impregnated surface coating composition, as disclosed by Japanese Patent Application "Kokai" (Laid-open) No. 53,012/77; an ink jet recording paper disclosed in Japanese Patent Application "Kokai" (Laid-open) No. 49,113/78, which is prepared by impregnating a base sheet containing an internally added urea-formaldehyde resin powder with a water-soluble polymer; an ink jet recording paper comprising a support and, provided thereon, an ink absorptive coating layer, as disclosed by Japanese Patent Application "Kokai" (Laid-open) No. 5,830/80; an ink jet recording sheet in which non-colloidal silica is used as the pigment in the coating layer, as disclosed by Japanese Patent Application "Kokai" (Laid-open) No. 51,583/80; an ink jet recording paper having a coating layer of a water-soluble polymer, as disclosed by Japanese Patent Application "Kokai" (Laid-open) No. 146,786/80; and a method for controlling the enlargement of the ink dot and the rate of ink absorption by providing two or more coating layers on a support, the uppermost layer having an ink absorption rate of 1.5–5.5 mm/minute and the second layer, disposed between said uppermost layer and the support, having an ink absorption rate of 5.5–60.0 mm/minute.

However, the technical idea such as the one disclosed in Japanese Patent Application "Kokai" (Laid-open) No. 53,012/77 is to secure an image of high resolution at the sacrifice of some degree of ink absorptivity. The idea such as that disclosed in Japanese Patent Application "Kokai" (Laid-open) No. 49,113/78 affords a certain degree of improvement in ink absorptivity as well as in image resolution, but has a disadvantage of reduced image density due to an increased permeation of the ink into the bulk of paper sheet. Consequently, both of the said recording sheets are unsatisfactory for the multicolor ink jet recording. In order to overcome the above difficulties, it was proposed to provide an ink absorptive coating layer on the support, as disclosed in Japanese Patent Application "Kokai" (Laid-open) No. 5,830/80. It is true that as compared with an ink jet recording paper sheet of the so-called plain paper type carrying no surface coating layer, the recording paper provided with a coating layer of a pigment having a high ink absorptivity or a polymer layer capable of absorbing the coloring ingredient of an ink is improved in ink absorptivity, image resolution, and color reproduction. However, along with the improvement in ink jet recording paper, the application field of ink jet recording has become wider and the equipment has made a marked progress. With the speed-up of the ink jet recording, it has become necessary to apply more ink to the same spot on the recording sheet and to feed the sheet at an increased speed. For these reasons, it has become necessary to supply an ink jet recording sheet having not only a larger ink absorptive capacity but also a higher rate of ink absorption so that the applied ink may become apparently dried immediately after the application. In addition, the recording sheet should produce an image of high resolution and high density.

BRIEF SUMMARY OF THE INVENTION

The present inventors found that for the purpose of producing an ink jet recording sheet having a high rate of ink absorption so as to render the ink apparently dry immediately after the application, it is most effective to construct the uppermost layer, with which the ink droplets come in first contact, with pigment particles of a suitable size to utilize the capillary effect of the interparticle voids or to provide a porous layer of the similar pore size or pore radius absorb the ink. It was also found that in order to maintain a high image resolution and a high ink absorptivity, it is necessary to provide an ink receptive layer having an extremely large void volume by using a pigment having primary particles of very small size. The present invention has been accomplished on the basis of the above discovery.

The subject matter of this invention is an ink jet recording sheet comprising a support and, provided thereon, one or more ink receptive layers, which is characterized in that the pore radius distribution of the uppermost layer shows at least one peak at 0.2 to 10 μm and that of ink receptive layers as a whole shows at least two peaks, one at 0.2 to 10 mμ and the other at 0.05 mμ or below.

DETAILED DESCRIPTION OF THE INVENTION

Figure 1:
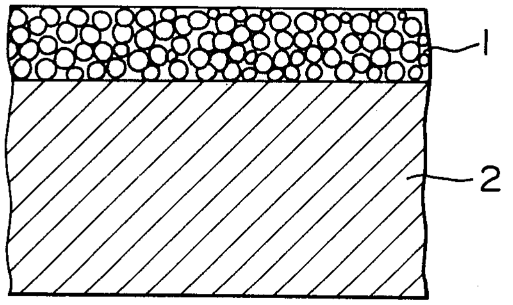
FIG. 1 is a sectional view of a recording sheet comprising a support and a single ink receptive layer provided thereon.

The ink jet recording sheet of this invention has many advantages including a high density and bright color (sharp tone) of the image or letters recorded on the sheet, a high rate of ink absorption, and a minimum of ink fethering and is especially suitable for the multicolor ink jet recording.

The idea of dual structure has been disclosed in Japanese Patent "Kokai" (Laid-open) No. 11,829/80. According to said Patent Application, the rate of ink absorption of the uppermost layer, with which the ink droplets first come into contact, is kept below a certain limit to improve the resolution of recorded image, and the intermediate layer (second layer) disposed between said uppermost layer and the support has a rate of ink absorption larger than that of the uppermost layer to allow the ink to permeate deep into the interior of sheet without lateral or horizontal diffusion, thus rendering the sheet competent as the ink jet recording sheet. Such a structure, however, is in contrast with that of the recording sheet of the present invention with respect to the roles played by the uppermost layer and the intermediate layer (second layer). According to the said Patent Application, the uppermost layer behaves as a rate-determining step for ink absorption. As a consequence, it is difficult for the sheet to acquire a high rate of ink absorption comparable to that achieved according to the present invention.

The recording sheet meeting the aforesaid requirements according to this invention has a high rate of ink absorption so that upon being applied, the ink instantly becomes apparently dry and even if a just delievered copy comes in accidental touch with an operator or some of the recording equipment, no smudging will take place. Another advantage of the high rate of ink absorption is a high resolution of the recorded image. Although the exact reason for this is unknown, it seems that the ink momentarily absorbed by the larger voids in the uppermost layer of the sheet is taken up at the next moment by the large void volume of tiny pores having a pore radius of 0.05 μm or below.

The recording sheet of this invention has the structure such that one or more ink-absorptive, ink receptive layers having the aforesaid pore size distribution are disposed on a support such as a paper sheet or a thermoplastic synthetic resin film base. In an embodiment of the present invention, in which the ink receptive layer provided on a support is a single layer, primary particles of a pigment having an average size of 0.20 μm or below are agglomerated to form secondary or tertiary agglomerates of 1 to 50 μm in average size and the resulting agglomerates are coated on a support to form the ink receptive layer. In this ink receptive layer, the voids formed between the agglomerates show the frequency peak at 0.2–10 μm of the voids radius distribution curve and the pores formed between primary particles show the frequency peak at 0.05 μm or below on the same curve.

According to this invention the type of substance constituting the primary particles is not specific. The suitable substances include all of those in the form of particulate having an average size of 0.20 μm or below. Examples are synthetic silica, aluminum hydroxide, synthetic alumina, light calcium carbonate, zinc oxide, and synthetic organic pigments.

To agglomerate the primary particles into agglomerated particles of 1 to 5 μm in average size, various methods may be used as shown below. Other methods may also be used so long as they afford the materials as specified above.

(1) Colloidal particles of 0.10 μm or below in average size have a tendency to agglomerate spontaneously to secondary or tertiary agglomerates. When a pigment in such a form is dispersed in water, there is obtained a suspension of secondary and tertiary agglomerates of several μm to several hundred μm in size. On being wet-ground under an appropriate shear, such coarse agglomerates form a suspension of secondary and tertiary agglomerates of 1 to 50 μm in average size. For the wet grinding to produce a suspension of uniform agglomerate size, a dispersion mill of the trituration type such as ball mill or sand mill (e.g. sand grinder) is preferred to the impact type such as a high-speed dispersion mixer (e.g. "KD mill"). When the tendency of spontaneous agglomeration is utilized, "white carbon" or colloidal calcium carbonate produced by the wet process may be used as raw material.

(2) The method described above in (1) utilizes the spontaneous agglomeration tendency of primary particles. If the average size of primary particles becomes 0.1 μm or larger, the spontaneous agglomeration tendency is not always expectable. In such a case, it is possible to obtain secondary and tertiary agglomerates of 1 to 50 μm in average size by drying a suspension after addition of a binder or adhesive, then grinding, and classifying, as disclosed by the present inventors in Japanese Patent Application No. 164,301/81. For this purpose "white carbon", precipitated calcium carbonate, and superfine zinc oxide powder produced by the wet process may be used as primary particles. White carbon is a colloidal silica produced by precipitation, see Chemical Encyclopedia, Volume 8, page 814 published by Kyroitsu Shuppan K.Y. (Japan).

(3) It is possible to obtain from a hydrogel-forming substance a xerogel powder of 1 to 50 μm in size by drying the hydrogel to a xerogel, grinding and classifying the xerogel, or by granulating the hydrogel to a suitable size of secondary and tertiary agglomerates, and drying. For this purpose, a hydrogel-forming substance such as, for example, aluminum hydroxide, alumina, silica, or magnesium oxide may be used.

(4) It is also possible to use so-called sintered particles formed by sintering the hydrogel or xerogel to strengthen the bonding between the primary particles of the oxide, as disclosed in Japanese Patent Application "Kokai" (Laid-open) No. 120,508/81.

(5) It is also possible to use secondary agglomerates of several μm to several tens μm in size obtained by agglomerating fine particles, 0.5 μm or below in size, of an emulsified polymer having a glass transition temperature of 40° C. or above, or of a thermosetting polymer. For this purpose, use may be made of a polystyrene emulsion or polyacrylic acid emulsion, in which the polymer has a glass transition temperature of 40° C. or above; urea-formaldehyde resin may be used as a thermosetting resin.

(6) The forming of finely subdivided particles such as colloidal silica or colloidal alumina into particulates of 1 μm or above in size can be achieved, as disclosed in U.S. Pat. No. 3,855,172, by forming a urea-formaldehyde resin or the like in an aqueous suspension of the finely subdivided substance under controlled conditions to obtain tiny spherical particulates having an intended size of secondary agglomerates. Further, it is possible to obtain microcapsules having inorganic capsule walls by allowing the above finely subdivided substance to adsorb to the surface of microcapsules.

(7) It is possible to use sintered inorganic particles prepared by burning the tiny spherical particulates obtained above by use of an organic binder.

The thickness of the ink receptive layer comprising the above-noted particulates is 1 to 100 μm, preferably 5 to 40 μm, but the thickness is not limited to such a range so long as the cumulative void volume is 0.3 ml/g or above, preferably the cumulative volume of pores having a radius of 0.05 μm or below is 0.2 ml/g or above, and the cumulative void volume of the ink receptive layers as a whole is 0.3 ml/g or above.

In an embodiment of the invention in which the ink receptive layer is composed of two or more strata, it is necessary that the pore radius distribution of the uppermost layer shows at least one peak at 0.2 to 10 μm. This requirement can be met by coating with a particulate pigment of 1 to 50 μm in average size, but the particulate size is not critical so long as the coating layer of the pigment on a support shows a pore radius distribution having at least one peak at 0.2–10 μm. Examples of suitable pigments include inorganic pigments such as calcium carbonate, kaolin (clay), talc, calcium sulfate, barium sulfate, titanium oxide, zinc oxide, zinc sulfide, zinc carbonate, satin white, aluminum silicate, aluminum hydroxide, diatomaceous earth, calcium silicate, magnesium silicate, alumina, and lithopone; and organic particulates such as plastic pigment and microcapsule. Further glass beads, glass microballon, alumina bubble, gas-filled microcapsule, synthetic fiber, and cellulose fiber are used as a pore constituting material. These pigments and other materials are able to form an uppermost layer having a pore radius distribution with a peak at 0.2 to 10 μm and exhibit an extremely high rate of ink absorption. However, a sufficient ink-receptive capacity of the ink receptive layer is not imparted to the recording sheet by such a coating layer alone. It is, therefore, necessary to dispose an intermediate layer (second layer) of a large ink-receptive capacity, in which layer the total pore volume of pores of 0.05 μm or below in size is 0.2 ml/g or above. To provide such an intermediate layer, a pigment having a particle size of 0.2 μm or below is coated by various means to form a layer. It is also possible to utilize a film sheet or a glass sheet having a large number of fine pores of 0.05 μm or below in size, or a paper sheet loaded with a filler in which the total volume of pores of 0.05 μm or below in size is 0.2 ml/g or more and which is prepared by agglomerating pigment particles of 0.2 μm in size. These materials can be used also as a support.

It is thus possible to form an ink-receptive composite layer having a pore radius distribution with at least two peaks, one at 0.2 to 10 μm and the other at 0.05 μm or below, by providing an uppermost layer having a pore radius distribution with a peak at 0.2 to 10 μm and, beneath and in touch with the uppermost layer, an intermediate layer having a pore radius distribution with a peak at 0.05 μm or below.

In the case of a composite ink-receptive layer of two or more strata placed on a support, the uppermost stratum to be provided on top of the intermediate stratum (or strata) can be composed of those secondary or tertiary agglomerates which are prepared from fine primary particles so as to show a pore radius distribution with at least two peaks, one at 0.2 to 10 μm and the other at 0.05 μm or below. Such a composite ink-receptive layer is desirable, because of its increased ink-receptive capacity owing to the increase in total volume of pores of 0.05 μm or below in size. It is also possible to use a mixture of said agglomerate and common pigment particles of 1 to 50 μm in size. In this case it is necessary to select properly the pigment particle size so that the uppermost stratum may have a pore radius distribution with at least one frequency peak at 0.2 to 10 μm.

Figure 2:
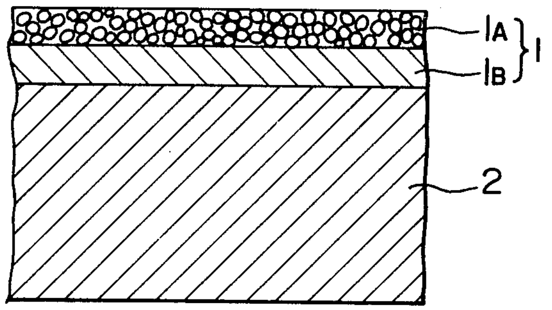
FIG. 2 is a sectional view of a recording sheet comprising a support and, provided thereon, an ink receptive layer composed of a top layer and an intermediate (second) layer.

Examples of embodiments of the present invention are shown in FIG. 1 and FIG. 2. In the example shown in FIG. 1, a single ink-receptive layer 1 is provided on a support 2, while in the example shown in FIG. 2, a composite ink-receptive layer 1 comprising an uppermost stratum 1A and an intermediate stratum (second layer) 1B is provided on a support 2.

As the support on which the ink-receptive layer is provided, use may be made of materials in sheet form such as paper and thermoplastic resin film. The material of the support is not specifically limited. Common supports include properly sized paper and films of polyester, polystyrene, polyvinyl chloride, polymethyl methacrylate, cellulose acetate, polyethylene, and polycarbonate. The paper support may contain fillers. The film support may be either transparent with no solid pigment or white one containing a white pigment or tiny bubbles. Examples of white pigments include titanium oxide, calcium fulfate, calcium carbonate, silica, clay, talc, and zinc oxide. Although not subject to any special restriction, the thickness of the support is generally 10 to 300 μm. A layer to improve the adhesion between the film support and the ink receptive layer may be provided.

In an embodiment of the present invention, the ink-receptive layer provided on the surface of recording sheet is composed of aforementioned pigment particles and an adhesive to hold them in place. Examples of the adhesives include starch derivatives such as oxidized starch, etherified starch, esterified starch, and dextrin; cellulose derivatives such as carboxymethylcellulose, and hydroxyethylcellulose; casein, gelatin, soybean protein, polyvinyl alcohol and derivatives, and maleic anhydride resin; latices of conjugated diene-base polymers such as ordinary styrene-butadiene copolymer and methyl methacrylate-butadiene copolymer; latices of acrylic polymers such as polymers or copolymers of acrylic esters and methacrylic esters; latices of vinyl polymers such as ethylene-vinyl acetate copolymer; latices of functional group modified polymers such as the above polymers modified with a functional group such as carboxyl group; aqueous adhesives of thermosetting synthetic resins such as melamine resins and urea resins; and adhesives based on synthetic resins such as polymethyl methacrylate, polyurethane resins, unsaturated polyester resins, vinyl chloride-vinyl acetate copolymer, polyvinyl butyral, and alkyd resins. The adhesive is used in an amount of 2 to 50, preferably 5 to 30, parts for 100 parts of the pigment, though the ratio is not limited to said range so long as the amount used is sufficient for fixing the pigment. However, it is not recommendable to use more than 100 parts of an adhesive, because the frequency peak of pore size distribution may sometimes be shifted due to film formation of the adhesive.

The ink-receptive layer may be incorporated, if necessary, with suitable amounts of dispersants for pigments, thickeners, flow modifiers, defoamers, foam depressors, release agents, foaming agents, colorants, and others.

In forming an ink-receptive layer on a support by applying a pigment coating composition, use may be made of any of the common coaters such as blade coater, air knife coater, roll coater, brush coater, curtain coater, bar coater, gravure coater, and spray gun. When a paper support is used, the ink receptive layer can be applied by on-machine coating using a size press or a gate roll attached to the paper making machine. The recording sheet carrying a freshly applied ink receptive layer can be used as such in the ink jet recording, or after having been improved in surface smoothness by passing through the roll nip of a super calender, gloss calender, or the like under application of heat and pressure. However, excessive treatment with a super calender may possibly lead to a change in the carefully established size of interparticle void, whereby the conformity to the specified pore size distribution might be lost. Therefore the extent of super-calendering should be properly controlled.

It is essential that the recording sheet of the invention has a pore size distribution curve with at least two peaks, one at 0.2 to 10 μm and the other at 0.05 μm or below.

The pore radius distribution, as herein referred to, is obtained by calculation from the void volume distribution curve [Urano, "Hyomen" (surface), 13 (10), p. 588 (1975); Onogi, Yamanouchi, Murakami, Imamura, Journal of the Japanese Technical Association of the Pulp and Paper Industry, 28, 99 (1974)] determined by the mercury intrusion porosimetry [E. W. Washburn, Proc. Natl. Acad. Sci, 7, p. 115 (1921); H. L. Ritter, L. E. Orake, Ind. Eng. Chem., Anal., 17, p. 782, 787 (1945); L. C. Drake, Ind. Eng. Chem., 41, p. 780 (1949); H. P. Grace, J. Amer. Inst. Chem. Engrs., 2, p. 307 (1956)]. The porosimeter employed is "Mercury Pressure Porosimeter MOD 220" of Carlo Erba Co. The pore radius is calculated by the following equation (1), assuming that the pore has a circular section:

$$P\gamma = 2\alpha \cdot \cos\theta \quad (1)$$

where $\gamma$=pore radius; $\alpha$=surface tension of mercury, 482.536 dyne/cm; $\theta$=angle of contact; and P=pressure applied to mercury. The mercury pressure was varied from 1 to 2,000 kg/cm$^2$ (absolute).

Preparation of sample: A piece of polyester film, 80 μm in thickness, is treated on one side with corona discharge to make it hydrophilic. The hydrophilized surface is coated with an ink receptive layer composition to be tested so that a coating amount after drying becomes 10–15 g/m$^2$ and used as sample for the determination of pore size distribution. When the ink receptive layer is composed of two strata, the sample is prepared for each stratum.

About 1 g of the sample is accurately weighed and the cumulative void volume per unit weight (ml/g) is measured by means of the porosimeter. The frequency obtained by differentiation of the cumulative void volume is plotted against the pore radius (Å) to construct the pore radius distribution curve. The cumulative void volume of the ink receptive layer ($V_I$, ml/g) is calculated from the cumulative void volume of the sample ($V_T$, ml/g) measured at mercury pressures up to 2,000 kg/cm$^2$, the cumulative void volume of the support ($V_B$, ml/g) at mercury pressures up to 2,000 kg/cm$^2$, the weight of the ink receptive layer per unit area (w, g/m$^2$), and the weight of the support per unit area (W, g/m$^2$) by the following equation:

$$\text{Cumulative void volume of ink receptive layer} = V_I\ (\text{ml/g}) = [V_T(w+W) - V_B \cdot W]/w$$

The support can be of any of the materials including polymer materials. The recording sheet itself comprising a support and an ink receptive layer provided thereon can be used as the sample. Approximate values of cumulative void volume of the supports are generally 0–0.02 ml/g for polymer film sheets, 0.1 to 0.8 ml/g for paper sheets depending upon the type and quantity of internally added filler, beating degree, and density, and 0.2–0.4 ml/g for a coated paper. The cumulative void volume of a support ($V_B$, ml/g) as herein referred to is a value determined on the support of a recording sheet after removal of the ink receptive layer.

The void volume of pores of a size of 0.05 μm or below in the ink receptive layer ($V_F$, ml/g), as herein referred to, is a value calculated by the following equation from the reading on the cumulative void curve of a recording sheet at the pore size of 0.05 μm, which corresponds to the cumulative void volume up to the mercury pressure of 150 kg/cm$^2$ ($V_{0.05}$, ml/g):

$$\text{Void volume of pores of a size of 0.05 μm or below} = V_F\ (\text{ml/g}) = (V_T - V_{0.05})(w+W)/w$$

When one of the frequency peaks of pore radius distribution is at 0.2 to 10 μm, the rate of ink absorption becomes very high and the ink dot instantly becomes apparently dry. If the frequency peak is at 10 μm or above, the ink absorption is sufficiently high, but the shape of ink dot is not enough circular. If the peak is at 0.05 to 0.2 μm, the color becomes dull owing to the diffuse reflection of light. Further, if the void volume of pores of 0.05 μm or below in size is small, the resolution of the image is deteriorated.

The thickness of the ink receptive layer is 1 to 100 μm, preferably 5 to 40 μm. For the ink receptive layer of dual structure, the thickness of the uppermost layer is preferably 5 to 20 μm; a larger thickness will detract from the sharpness or resolution of the image. The thickness of the intermediate layer (second layer) is 1.0 μm or more, preferably 5 μm or more, but the thickness of the intermediate layer becomes free of any special restriction when the void volume of pores of 0.05 μm or more is 0.2 ml/g or more. If the said void volume is short of 0.2 ml/g, the ink-absorptive capacity becomes insufficient and the resolution or sharpness of the image will be injured. In case a paper support is used, the effect of pores in the support appears as a peak at a pore radius of 0.5 to 5 μm. This should be subtracted from the peak of ink receptive layer.

When the ink jet recording is performed on the recording sheet of this invention, there is obtained an image of bright color (sharp tone) and good resolution sufficient for practical use owing to a high ink-absorptive capacity and a high rate of ink absorption of the recording sheet.

The invention is illustrated below with reference to Examples, but the invention is not limited thereto. In Examples all parts and percentages are by weight. The performance characteristics of the recording sheet to evaluate its suitability for the ink jet recording were tested in the following way:

(1) Rate of ink absorption

A droplet (0.0006 ml) of a water-base ink for ink jet recording is brought into contact with the surface of a recording sheet and the time (in second) elapsed from the moment of contact to the complete absorption is measured.

(2) Image resolution

A droplet, 100 μm in diameter, of a water-base ink for ink jet recording is brought into contact with the surface of a recording sheet. After absorption of the ink, the area of the mark left by the ink droplet is measured to calculate the diameter (μm), assuming that the mark is a perfect circle. The smaller the diameter, the higher is the resolution.

(3) Ink absorptive capacity

Using an ink jet recording equipment, droplets of water-base inks in 4 colors, cyan, magneta, yellow and black, are allowed to fall upon the same spot on the surface of a recording sheet and the spreading behavior of the ink droplets is inspected to rate the ink absorptive capacity.

Example 1

Figure 3:
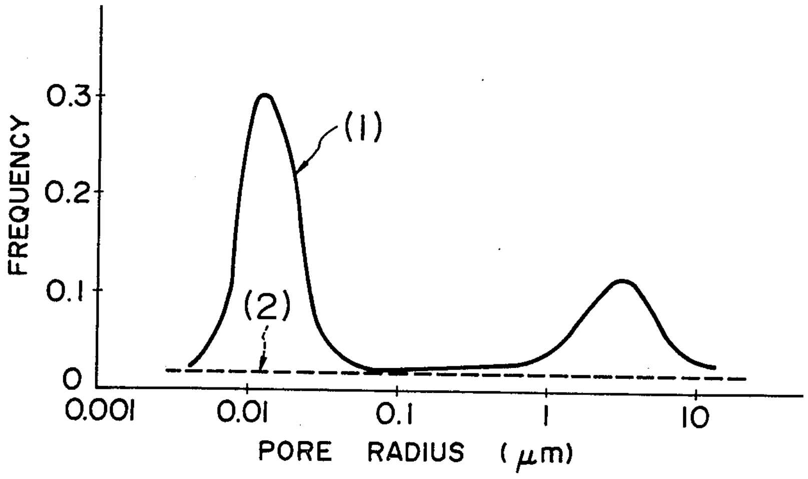
FIG. 3 is a pore size distribution curve obtained by plotting the frequency against the pore radius in the ink receptive layer of the product of the invention.
Figure 4:
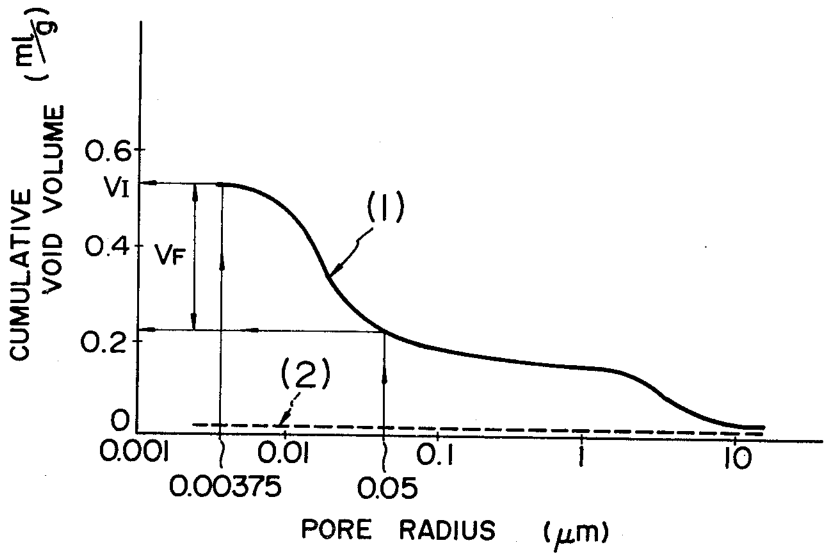
FIG. 4 is a curve of cumulative void volume plotted against the pore radius in the ink receptive layer of the product of the invention.

According to the procedure disclosed in detail in U.S. Pat. No. 3,855,172, Example 1, a granular pigment was prepared by granulating colloidal silica of 40 mμ in particle size ("Snowtex OL" of Nissan Chemical Co.) with a urea resin as binder, and roasting the granules to yield spherical agglomerates of 10 μm in size. A coating composition of 20% solids content was prepared by mixing 100 parts of the above pigment agglomerates and 15 parts of polyvinyl alcohol ("PVA 117" of Kuraray Co.) as an adhesive. The coating composition was coated on the corona discharge treated surface of a piece of polyethylene terephthalate film at a coverage of 15 $g/m^2$ on dry basis and drying to form an ink receptive layer on the support of polyethylene terephthalate. The results of measurement by the mercury intrusion porosimetry and the results of tests for performance characteristics were as shown in Table 1 and FIG. 3. In FIG. 3, (1) is the pore size distribution curve obtained by plotting the differential (frequency) of the cumulative void volume (ordinate) against the pore radius in logarithmic scale (abscissa). The curve (2) drawn in broken line in FIG. 3 is the pore size distribution curve of the polyethylene terephthalate film, 80 μm in thickness, used as the support. In FIG. 4 are shown the cumulative void volume curves in solid line (1) and in broken line (2) for the ink receptive layer and the support, respectively.

Example 2

A granular pigment was prepared by grinding the burned alumina described in Example 1 by Japanese Patent Application "Kokai" (Laid-open) No. 120,508/81 and classifying to collect a granular pigment of 30 μm in average size. A recording sheet was prepared in the same manner as in Example 1, except that the above granular pigment was used. The results of tests performed as in Example 1 on the above recording sheet were as shown in Table 1.

Example 3

A recording sheet was prepared in the same manner as in Example 1, except that the granular pigment used was "Syloid 620" (a type of silica gel, 20 μm in size, produced by Fuji Davison Chemical Co.) which is a micron-sized xerogel formed from a hydrogel obtained by the gelation of silicic acid. The results of tests were as shown in Table 1.

Example 4

A mixture of 100 parts of "Activated Zinc Oxide AZO" of Seido Chemical Co. (superfine zinc oxide of 0.10 μm in average particle radius, manufactured by the wet process) and 3 parts of a solution of polyvinyl alcohol ("PVA 117" of Kuraray Co.) was diluted with water to a 50% slurry, then kneaded thoroughly, and dried. The resulting lump was ground and classified to collect a granular pigment of 40 μm in average size. A recording sheet was prepared in the same manner as in Example 1, except that the above granular pigment was used. The test results were as shown in Table 1.

Example 5

A mixture of 25 parts of "Vitasil #1500" (a type of white carbon produced by Taki Chemical Co.), finely powdered silica of 18 μm in primary particle size, and 75 parts of water was stirred to form a 25% slurry, The slurry was wet ground by passing through a sand grinder containing glass beads to form a slurry of secondary agglomerates of 4 μm in average size. A recording sheet was prepared in the same manner as in Example 1, except that the above slurry was used as the granular pigment. The test results were as shown in Table 1.

Example 6

A recording sheet was prepared in the same manner as in Example 1, except that a mixture of 70 parts of the same granular pigment as used in Example 1 and 30 parts of "Escarone #200" (a powdered lime of 2 μm in average particle size, a product of Sankyo Seifun Co.) was used in place of the granular pigment. The test results were as shown in Table 1.

Comparative Examples 1 to 7

Recording sheets of Comparative Examples 1 to 7 were prepared in the same manner as in Example 1, except that, in place of the granular pigment, use was made of "Escarone #200" ( a type of ground lime, Sankyo Seifun Co.), "Ansilex" (burned kaolin, Engelhard Co.), "PC" (precipitated calcium carbonate, Shiraishi Kogyo Co.), "Snowtex O" (colloidal silica, Nissan Chemical Co.), "Aerosil 130" (Japan Aerosil Co., a finely dispersible superfine silica powder), "L-8801" (a plastic pigment, 0.4 μm in particle size, Asahi Dow Co.), and "Hyogo Talc" (a type of talc for paper making, Hyogo Clay Co.), respectively. Results of the test performed as in Example 1 were as shown in Table 1.

Figure 5:
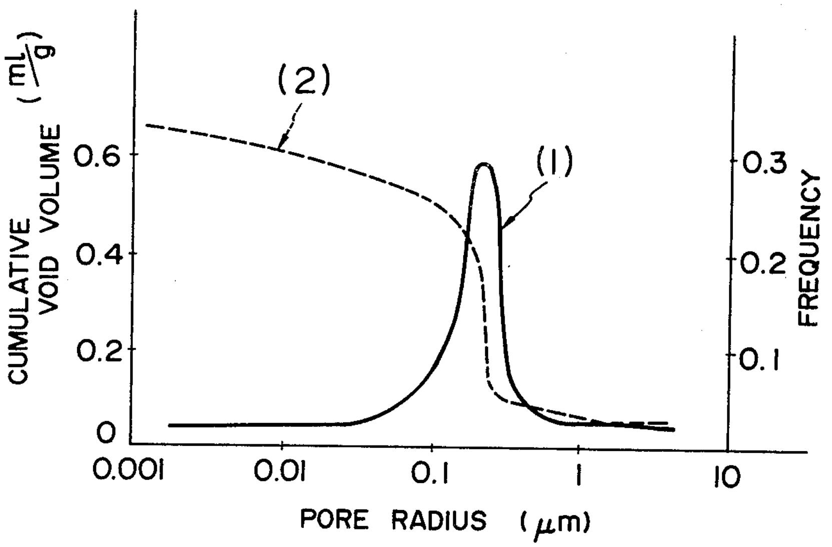
FIG. 5 represents curves of frequency and cumulative void volume plotted against the pore radius in the ink receptive layer of the prior art product.

The pore size distribution of the polyethylene terephthalate film used as support in the above recording sheets was determined by mercury intrusion porosimetry. The cumulative void volume ($V_B$) at a mercury pressure of 2,000 kg/cm$^2$ was found to be 0.018 ml/g. The weight per unit area, W, of the film was 106.0 g/m$^2$. In FIG. 5 are shown the pore size distribution curve (1) (in solid line) and the cumulative void volume curve (2) (in broken line) of the recording sheet of Comparative Example 2.

TABLE 1

| | Location of peak of pore radius distribution | | Cumulative void volume of ink receptive layer | | Rate of ink absorption | Resolution | Ink absorptive capacity |
|---|---|---|---|---|---|---|---|
| | | | $V_I$ | $V_F$ | | | |
| | μm | μm | ml/g | ml/g | sec. | μm | |
| Example 1 | 0.9 | 0.01 | 0.502 | 0.307 | <0.5 | 190 | Good |
| Example 2 | 3.5 | 0.02 | 0.639 | 0.589 | <0.5 | 205 | Excellent |
| Example 3 | 1.0 | 0.005 | 1.123 | 0.452 | <0.5 | 192 | " |
| Example 4 | 4.0 | 0.008 | 0.158 | 0.242 | <0.5 | 209 | Good |
| Example 5 | 0.3 | 0.03 | 1.091 | 0.815 | <0.5 | 202 | Excellent |
| Example 6 | 0.9 | 0.01 | 0.492 | 0.300 | <0.5 | 203 | Good |
| Comparative Example 1 | 0.9 | — | 0.147 | 0.089 | <0.5 | 340 | Poor |
| Comparative Example 2 | 0.15 | — | 0.671 | 0.129 | 1.2 | 280 | Good |
| Comparative Example 3 | 0.2 | — | 0.494 | 0.105 | <0.5 | 310 | Poor |
| Comparative Example 4 | — | 0.01 | 0.536 | 0.321 | 15.2 | 212 | Good |
| Comparative Example 5 | — | 0.02 | 0.988 | 0.756 | 13.0 | 208 | Excellent |
| Comparative Example 6 | — | 0.07 | 0.389 | 0.177 | 0.8 | 315 | Poor |
| Comparative Example 7 | 0.7 | — | 0.122 | 0.071 | 0.6 | 350 | " |

As is apparent from Table 1, those having a pore radius distribution with two peaks are good in all of the performance characteristics such as the rate of ink absorption, resolution of the image, and ink absorptive capacity, whereas those which shows only one peak at a larger pore radius are poor in resolution and ink absorptive capacity, though excellent in the rate of ink absorption, those which shows only one peak at a smaller pore radius are inferior in the rate of ink absorption, though excellent in resolution, and those which show only one peak at an intermediate pore radius are of the halfway properties not suitable for ink jet recording.

Examples 7 to 12

A fine powder of silica produced by the wet process ("Vitasil #1600" of Taki Chemical Co.; 20 mμ in average primary particle size) was milled in "KD Mill" for 30 minutes to yield a 25% slurry of secondary agglomerates, 0.1 μm or below in average particle size. A solution of polyvinyl alcohol ("PVA 110" of Kuraray Co.), an adhesive, was added to the above slurry so that the weight ratio of the silica to the polyvinyl alcohol may become 100:15 on dry basis. The resulting slurry was coated on the corona discharge treated surface of a polyethylene terephthalate film support, 80 μm in thickness, at a coverage of 7 g/cm$^2$ on dry basis.

Another coating composition containing 100 parts of one of the granular pigments shown below and 15 parts of polyvinyl alcohol ("PVA 117" of Kuraray Co.) was coated over the above-said coating layer to form an uppermost layer.

In the recording sheet of Example 7, a ground limestone ("Escaron #200" of Sankyo Seifun Co.), 2 μm in average particle size, was used as the granular pigment in the uppermost layer. In the uppermost layers of the recording sheets of succeeding Examples 8–12, use was made of "Hyogo Talc" (7 μm in average particle size; Hyogo Clay Co.), "Zeolex 17S", a spherical polystyrene pigment of 1 μm in average particle size, "Syloid 620" (a silica gel of 20 μm in secondary particle size; Fuji Davison Co.), and the same granulated pigment as used in Example 1 (40 mμ in primary particle size and 10 μm in average spherical agglomerate size), respectively.

The data obtained by the mercury intrusion porosimetry and the data on performance characteristics for each recording sheet were as shown in Table 2.

Comparative Examples 8 to 13

In these Comparative Examples, the coating compositions were the same as used in Examples 7 to 12, but the coatings were applied in reverse order. The data obtained were as shwon in Table 2.

In determining the pore radins distribution of each layer in Examples 7 to 12, the data for the uppermost layer were obtained on the sample prepared by providing the coating layer directly on the support at a coverage of 10 $g/m^2$ on dry basis, as described previously. The data for the intermediate layer (second layer) were obtained on the sample without the uppermost layer.

TABLE 2

| | Location of peak of pore radius distribution | | | | Cumulative void volume of ink receptive layer | | Rate of ink absorption | Resolution | Ink absorptive capacity |
|---|---|---|---|---|---|---|---|---|---|
| | Uppermost layer | | 2nd layer | | $V_I$ | $V_F$ | | | |
| | µm | µm | µm | | ml/g | ml/g | sec. | µm | |
| Example 7 | 0.9 | — | 0.018 | | 0.671 | 0.451 | <0.5 | 219 | Good |
| Example 8 | 0.7 | — | " | | 0.622 | 0.453 | <0.5 | 225 | " |
| Example 9 | 0.2 | 0.025 | " | | 0.892 | 0.554 | <0.5 | 211 | Excellent |
| Example 10 | 0.2 | — | " | | 0.718 | 0.516 | <0.5 | 209 | " |
| Example 11 | 1.0 | 0.005 | " | | 1.133 | 0.636 | <0.5 | 195 | " |
| Example 12 | 0.9 | 0.01 | " | | 0.802 | 0.560 | <0.5 | 197 | " |
| | µm | | µm | µm | | | | | |
| Comparative Example 8 | 0.018 | | 0.9 | — | 0.668 | 0.447 | 8.8 | 203 | Good |
| Comparative Example 9 | " | | 0.7 | — | 0.601 | 0.450 | 7.3 | 210 | " |
| Comparative Example 10 | " | | 0.2 | 0.025 | 0.799 | 0.515 | 13.2 | 202 | Excellent |
| Comparative Example 11 | " | | 0.2 | — | 0.686 | 0.502 | 9.8 | 200 | Good |
| Comparative Example 12 | " | | 1.0 | 0.005 | 1.130 | 0.629 | 15.0 | 190 | Excellent |
| Comparative Example 13 | " | | 0.9 | 0.01 | 0.813 | 0.555 | 6.3 | 191 | " |

As is apparent from Table 2, the location of the peak of pore radius distribution and the cumulative void volumes $V_I$ and $V_F$ showed nearly the same values in Examples and Comparative Examples (for example, compare Example 7 with Comparative Example 8). However, in the recording sheets having no peak at 0.2 to 10 µm in the pore radius distribution of the uppermost layer, a marked decrease was observed in the rate of ink absorption. In other words, in the Comparative Examples, one peak in the uppermost layer is at a pore radius of 0.018 µm, indicating that the uppermost layer plays the role of rate-determining step.

Example 13

Figure 6:
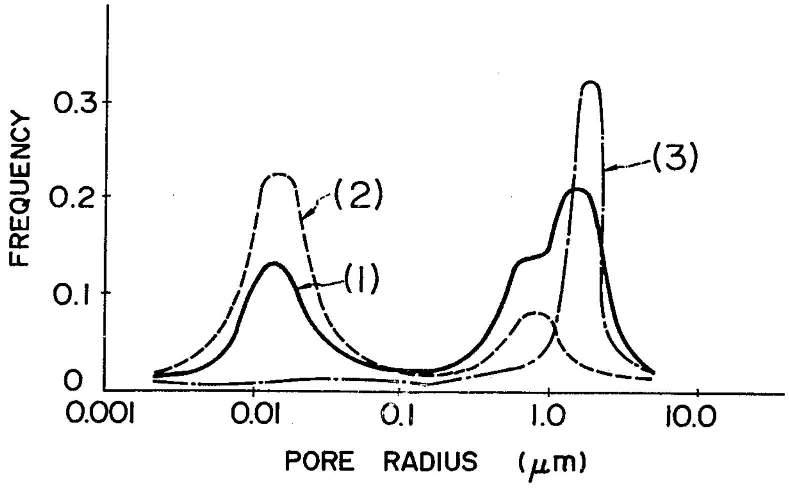
FIG. 6 is a pore radius distribution curve of the product of the invention in which the support is a paper sheet.

A xerogel ("Syloid 404" of Fuji Davison Co., secondary agglomerates of 10 µm in particle size) prepared by converting a silica sol into agglomerates of predetermined size and drying was used as the granular pigment. A coating composition of a concentration of 22% was prepared from 100 parts of the above xerogel and 40 parts of polyvinyl alcohol ("PVA 117" of Kuraray Co.) as adhesive. The coating composition was coated on one side of a coated paper sheet, 63 $g/m^2$ in basis weight, at a coverage of 16 $g/m^2$ on dry basis. The resulting sheet was passed through a super calender at a linear nip pressure of 120 kg/cm to obtain a recording sheet. The cumulative void volume was determined by mercury intrusion porosimetry on the above recording sheet as well as on the support of the recording sheet after removal of the coating layer with an adhesive cellophane tape. Further, the above coating composition was coated on the surface of a polyethylene terephthalate film (106.0 $g/m^2$) at a coverage of 13 $g/m^2$ and used as the sample for the determination of pore radius distribution. The results of determination were as shown in Table 3 and FIG. 6. In FIG. 6, the curve (1) in solid line is the pore radius distribution curve of the recording sheet, the curve (2) in broken line is that of the sample obtained by coating the composition on the film, and the curve (3) in chain line is that of the support (coated paper sheet) of the recording sheet after removal of the coating layer.

Comparative Example 14

"Kaolin, ultrawhite 90" (Engelhard Co.) generally used in art paper and coated paper was used as the granular pigment. A coating composition of a concentration of 40% was prepared from 100 parts of said kaolin and 10 parts of oxidized starch. The coating composition was coated at a coverage of 20 $g/cm^2$ on the same coated paper sheet as used in Example 13. The coated sheet was finished in the same manner as in Example 13 to obtain a recording sheet. Further, the coating composition was coated on the same film as used in Example 13 and used as the sample for determining the pore radius distribution. The results of determinations performed in the same manner as in Example 13 were as shown in Table 3 and FIG. 7.

Figure 7:
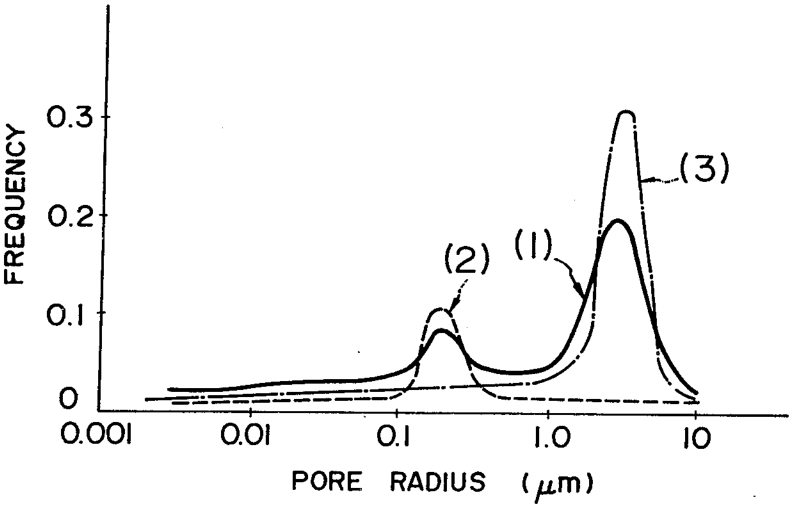
FIG. 7 is a pore radius distribution curve of the prior art product in which the support is a paper sheet.

In FIG. 7, the curve (1) in solid line is the pore radius distribution curve of the recording sheet, the curve (2) in broken line is that of the sample prepared by coating the film with the above coating composition and the curve (3) in chain line is that of the support (coated paper sheet) of the recording sheet after removal of the coating layer.

TABLE 3

| | Location of peak of pore radius distribution | | Cumulative void volume of ink receptive layer | | Rate of ink absorption | Resolution | Ink absorptive capacity |
|---|---|---|---|---|---|---|---|
| | μm | μm | $V_I$ ml/g | $V_F$ ml/g | sec. | μm | |
| Example 13 | 0.8 | 0.009 | 1.103 | 0.450 | <0.5 | 196 | Excellent |
| Comparative Example 14 | 0.15 | — | 0.210 | 0.156 | 28.0 | 285 | Poor |

As is apparent from Table 3, the recording sheet of Example 13, which meets the specified requirements according to this invention, has performance characteristics favorable for the ink jet recording, whereas the recording sheet of this Comparable Example 14, which does not meet the specified requirements, has unfavorable performance characteristics.

What is claimed is:

1. An ink jet recording sheet comprising a support and one or more ink receptive layers disposed thereon, wherein the pore radius distribution curve of the uppermost ink receptive layer shows a peak at 0.2 to 10 μm and that of the ink receptive layer or layers as a whole shows two peaks, one at 0.2 to 10 μm and the other at 0.05 μm or below.

2. An ink jet recording sheet according to claim 1, wherein the ink receptive layer is a single layer and contains agglomerates of 1 to 50 μm in average diameter produced by agglomerating primary particles of 0.20 μm or below in average particle diameter.

3. An ink jet recording sheet according to claim 2, wherein the primary particle is selected from the group consisting of synthetic silica, aluminum hydroxide, synthetic alumina, precipitated calcium carbonate, zinc oxide, and synthetic organic pigments.

4. An ink jet recording sheet according to claim 2, wherein the agglomerates are those which are produced by agglomerating colloidal particles of 0.10 μm or below in average particle diameter and wet-grinding the resulting agglomerates.

5. An ink jet recording sheet according to claim 4, wherein the colloidal particle is colloidal silica produced by the wet process or colloidal calcium carbonate.

6. An ink jet recording sheet according to claim 2, wherein the agglomerates are those which are produced by adding a binder to primary particles of 0.1 to 0.2 μm in average particle diameter, drying the mixture, then grinding and classifying.

7. An ink jet recording sheet according to claim 6, wherein the primary particle is selected from the group consisting of colloidal silica produced by the wet process, precipitated calcium carbonate, and superfine zinc oxide powder.

8. An ink jet recording sheet according to claim 2, wherein the agglomerates are those which are produced by drying a hydrogel to transform it into xerogel, then grinding the xerogel, and classifying.

9. An ink jet recording sheet according to claim 2, wherein the agglomerates are those which are produced by granulating a hydrogel as such and then drying.

10. An ink jet recording sheet according to claim 8 or 9, wherein the material forming the hydrogel is selected from the group consisting of aluminum hydroxide, alumina, silica, and magnesium oxide.

11. An ink jet recording sheet according to claim 2, wherein the agglomerates are those which are produced by transforming a hydrogel to xerogel by drying, baking the xerogel to calcined particles, then grinding the calcined particles, and classifying.

12. An ink jet recording sheet according to claim 2, wherein the agglomerates are those which are produced by granulating a hydrogel as such, drying the granulated bydrogel to form a xerogel, and burning the xerogel to form calcined particles.

13. An ink jet recording sheet according to claim 2, wherein the agglomerates are those which are produced by agglomerating an emulsified polymer having an average particle diameter of 0.5 μm or below and a glass transition temperature of 40° C. or above or a thermosetting polymer.

14. An ink jet recording sheet according to claim 13, wherein the emulsified polymer is an emulsified polystyrene or an emulsified polyacrylic acid.

15. An ink jet recording sheet according to claim 13, wherein the thermosetting polymer is a urea-formaldehyde resin.

16. An ink jet recording sheet according to claim 2, wherein the agglomerates are those which are produced by polymerizing a urea-formaldehyde resin in a suspension containing primary particles, urea and formaldehyde.

17. An ink jet recording sheet according to claim 16, wherein the agglomerates are further baked to yield particles consisting of a calcined inorganic substance.

18. An ink jet recording sheet according to claim 16 or 17, wherein the primary particle is colloidal silica or colloidal alumina.

19. An ink jet recording sheet according to claim 2, wherein the thickness of the ink receptive layer is 1 to 100 μm.

20. An ink jet recording sheet according to claim 19, wherein the thickness of the ink receptive layer is 5 to 40 μm.

21. An ink jet recording sheet according to claim 2, wherein the cumulative void volume of the ink receptive layer is 0.3 ml/g or above.

22. An ink jet recording sheet according to claim 21, wherein the void volume of pores having a pore radius of 0.05 μm or less is 0.2 ml/g or more.

23. An ink jet recording sheet according to claim 1, wherein the ink receptive layer is composed of two layers of which the lower layer disposed on a support has 0.2 ml/g or more of void volume of pores having a pore radius of 0.05 μm or less and the top layer disposed over said lower layer has a peak of pore radius distribution curve at 0.2 to 10 μm.

24. An ink jet recording sheet according to claim 23, wherein the top layer contains a pigment in particle form having an average particle diameter of 1 to 50 μm.

25. An ink jet recording sheet according to claim 23, wherein the lower layer disposed on the support contains a pigment having a particle diameter of 0.2 μm or less.

26. An ink jet recording sheet according to claim 23, wherein the pore radius distribution curve of the uppermost layer has two peaks, one at 0.2 to 10 μm and the other at 0.05 μm or below..

27. An ink jet recording sheet according to claim 26, wherein the uppermost layer contains agglomerated particles prepared by the agglomeration of primary particles.

28. An ink jet recording sheet according to claim 26, wherein the uppermost layer contains a pigment in particle form having an average particle diameter of 1 to 50 μm in addition to the agglomerated particles prepared by the agglomeration of primary particles.

29. An ink jet recording sheet according to claim 23, wherein the uppermost layer has a thickness of 5 to 20 μm.

30. An ink jet recording sheet according to claim 23, wherein the intermediate layer disposed on the support has a thickness of 10 μm or more.

31. An ink jet recording paper according to claim 1, wherein a single ink receptive layer is disposed on a support having 0.2 ml/g or more of void volume of pores having an average pore radius of 0.05 μ or below.

32. An ink jet recording sheet according to claim 31, wherein the support is selected from the group consisting of thermoplastic synthetic resin films, glass sheets, and paper incorporated with fillers.

33. An ink jet recording sheet according to claim 1, wherein the ink receptive layer is composed of a pigment in particle form and an adhesive.

34. An ink jet recording sheet according to claim 33, wherein the weight ratio of the adhesive to the pigment in particle form is 2–50:100.

35. An ink jet recording sheet according to claim 1, wherein the recording sheet is further treated by passing through a roll nip under application of heat and pressure to impart smoothness to the sheet.

* * * * *

UNITED STATES PATENT AND TRADEMARK OFFICE

CERTIFICATE OF CORRECTION

PATENT NO. : 4,460,637

DATED : July 17, 1984

INVENTOR(S) : Miyamoto Shigehiko et al

It is certified that error appears in the above-identified patent and that said Letters Patent is hereby corrected as shown below:

On the title page

(73) Assignee: "Mitsubushi" should read -- Mitsubishi --.

(30) Foreign Application Priority Data:
"56-271793" should read --56-211793

Signed and Sealed this

*Seventh* Day of *May 1985*

[SEAL]

*Attest:*

DONALD J. QUIGG

*Attesting Officer* *Acting Commissioner of Patents and Trademarks*